Sept. 5, 1950 C. H. HOEPPNER 2,520,932

SECONDARY EMISSION CIRCUIT FOR AMPLITUDE DISCRIMINATION

Filed April 26, 1945 2 Sheets-Sheet 1

PULSE RECEIVING SYSTEM

Inventor
CONRAD H. HOEPPNER

By Ralph L. Chappell
Attorney

Sept. 5, 1950 C. H. HOEPPNER 2,520,932

SECONDARY EMISSION CIRCUIT FOR AMPLITUDE DISCRIMINATION

Filed April 26, 1945 2 Sheets-Sheet 2

Inventor
CONRAD H. HOEPPNER

By Ralph L Chappell

Attorney

Patented Sept. 5, 1950

2,520,932

UNITED STATES PATENT OFFICE 2,520,932

SECONDARY EMISSION CIRCUIT FOR AMPLITUDE DISCRIMINATION

Conrad H. Hoeppner, Washington, D. C.

Application April 26, 1945, Serial No. 590,444

5 Claims. (Cl. 250—27)

(Granted under the act of March 3, 1883, as amended April 30, 1928; 370 O. G. 757)

This invention relates in general to electronic circuits having discriminatory response characteristics and in particular to an electronic circuit for amplitude discrimination.

In radio, radar, television and other electronic fields, it frequently occurs that a number of different potential variations may exist at the input to a component electronic circuit either fortuitously or by intention. If all of such potential variations are not to be impressed upon the component circuit, it is necessary to provide an intervening circuit with the ability to discriminate between those variations intended for ultimate application to the component circuit and those variations the effect of which would be undesirable. Some characteristics of the potential variations must be selected as a basis for pulse discrimination and among such characteristics are time duration, rate of voltage change, and amplitude.

It is an object of this invention to provide a circuit which is responsive only to potential variations or electrical impulses of a certain amplitude and polarity and un-responsive to potential variations or electrical impulses of all other amplitudes or polarity.

It is another object of this invention to provide a circuit which can be employed between a source of potential variations or electrical impulses and the receiver thereof as an intervening circuit which shields from such receiver all variations or pulses except those having a certain definite preselected amplitude and polarity.

It is another object of this invention to provide a discrimination circuit the discriminatory action of which is based upon certain definite characteristics of the applied input signal.

Other objects and features of this invention will become apparent upon a careful consideration of the following detailed description when taken together with the accompanying drawings in which.

Figure 1:
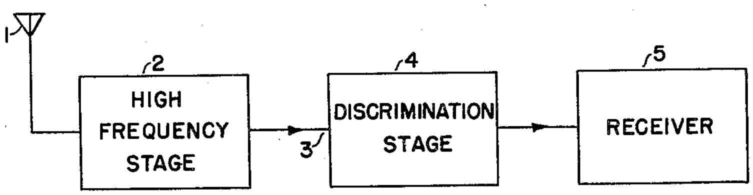
Fig. 1 is a simple block diagram of a system in which one embodiment of this invention is utilized.

Reference is now had in particular to Fig. 1 wherein there is shown one embodiment of this invention in which a discrimination circuit is employed to reject undesired video signals in a pulse receiving system. Pulses or bursts of high frequency energy received by antenna 1, amplified and detected by high frequency stage 2 are impressed, in the form of the envelope of the high frequency pulses to input 3 of the discrimination stage 4. Since the pulses of high frequency energy reaching antenna 1 may comprise not only a desired signal but also man-made and fortuitous interfering signals of a frequency which stage 2 will not reject, and since high frequency stage 2 may itself be a source of interfering signal, it is the function of the discriminination stage 4 to shield from receiver 5 all pulses not having the ampltiude (and polarity) characteristics of the desired signal.

Figure 2:
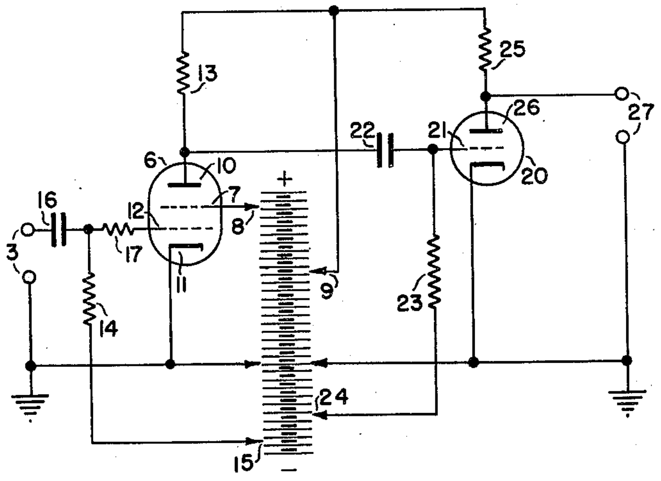
Fig. 2 is a circuit diagram of the embodiment of this invention shown in Fig. 1.

Reference is now had to Fig. 2 wherein there is shown one form of an ampltiude discrimination circuit constructed according to the teachings of this invention and which serves as discrimination stage 4 of the pulse reception equipment illustrated in Fig. 1.

In Fig. 2, the positive potential 8 to which screen grid 7 of four electrode vacuum tube 6 is connected is more positive than potential 9 to which anode 10 is connected through resistance 13 thereby creating a negative potential gradient from screen 7 to anode 10. Control grid 12 is normally biased sufficiently by connection through resistance 14 to negative potential 15 to hold tube 6 in a non-conducting condition. The coupling network comprising capacitor 16 and resistance 14 permits the application of signals from high frequency stage 2 which, if of sufficient amplitude and of positive polarity, raise the potential of grid 12 with respect to cathode 11 high enough to permit the flow of electrons toward screen 7. Obviously, any signal of amplitude less than that just described, or of negative polarity, will fail to disturb the quiescent condition of tube 6. The coupling network comprising capacitor 16 and resistance 14 has a time constant which is long with respect to the time duration of any signal impressed upon input 3 so that capacitor 16 assumes very little charge during any signal. Thus vacuum tube 6 and its associated components function to discriminate against electrical impulses from high frequency stage 2 of negative polarity and those of positive polarity of less than a pre-determined amplitude.

Positive pulses applied to input 3 and having an amplitude in the range between that which will initiate space current flow in tube 6 and that which will undertake to raise grid 12 above cathode 11 in potential will, however, disturb the quiescent condition of tube 6. The potential drop caused by flow of grid current through grid clipping resistance 17 will substantially nullify any attempt to raise grid 12 above cathode 11 and thereby places an upper limit on the disturbance of the quiescent condition of tube 6. The behavior of the potential variation appearing at anode 10 between the lower and upper limits just described enables the circuit of Fig. 2 to discriminate against positive pulses impressed upon input 3 of an amplitude either greater or less than a certain preselected amplitude in a manner which will be explained in the following paragraphs.

When tube 6 is in a conducting condition, the electrons which leave the space charge surrounding cathode 11 travel toward screen 7 and anode 10 under the accelerating influence of the positive potential gradient between grid 12 and screen 7. The density of the electron stream is controlled almost entirely by variations in the potential of grid 12 since screen grid 7 is held at a fixed potential by direct connection to source 8 and acts in the normal manner to shield the cathode space charge from potential variations which may appear at anode 10 by virtue of current flow through resistance 13.

The electron stream is divided into several groups after it passes grid 12. The first of these groups collides directly with the metallic elements of screen grid 7 and comprises a part of the screen grid current. This collision is at a velocity which is sufficient to cause electrons to be emitted from the surface of screen grid 7, the number of which is determined essentially by the velocity of bombardment and the work functioning energy of the screen grid surface. All such bombardment emitted electrons, which constitute secondary emission, are returned to screen grid 7 since it is the most positive electrode in tube 6. The second of these groups passes through the interstices of screen grid 7 with insufficient velocity to overcome the negative potential gradient existing between screen grid 7 and anode 10 and are thus turned back to screen grid 7 and constitute another part of the screen grid current. The third of these groups passes through the interstices of screen grid 7 with sufficient velocity to continue on to anode 10 and comprise conventional plate current flowing in such a direction through resistance 13 as to reduce the potential of anode 10 if allowed to act independently. This conventional plate current can be termed primary current to distinguish it from the current described below which flows as the result of secondary emission of electrons from anode 10. The majority of the electrons which reach anode 10 from the space charge of cathode 11 do so with sufficient velocity to dislodge secondary electrons from the surface of anode 10. These dislodged electrons, emitted into a potential gradient which is positive from anode 10 to screen grid 7, naturally gravitate to screen grid 7 and supplement the screen grid current. Inasmuch, however, as they move in a direction opposite to that of the electrons which constitute conventional or primary plate current, their flow is such as to increase the potential at anode 10 and they may therefore be termed secondary current. It will be apparent that the potential of anode 10 will be determined by the ratio of primary to secondary current. The potential of anode 10 of tube 6 will be negative with respect to the quiescent or cutoff potential if the ratio is greater than unity and will be positive with respect to quiescent potential if the ratio is less than unity.

In a discrimination circuit constructed according to the teachings of this invention, as shown in one form in Fig. 2, and employing one of several common receiving type multi-electrode vacuum tubes (such as 6AC7 pentode with suppressor direct connected to the screen grid to form a four electrode tube) as tube 6, the secondary current will exceed the primary current and thus give a ratio less than unity over a range from a virtually non-conducting condition of tube 6 up to a density of space current electron flow which so alters the potential gradient between screen grid 7 and anode 10 that enough of the secondary electrons emitted from anode 10 are returned to anode 10 to permit the proportion of primary current to secondary current to assume a value of unity or greater. This means that positive pulses above a certain predetermined amplitude controllable by potential 15 and below a certain predetermined amplitude controllable by potentials 8 and 9 impressed upon input 3 cause the potential at anode 10 to move in a positive direction. If the amplitude of the applied pulse exceeds the upper limit controllable by said potentials 8 and 9, primary exceeds secondary current and the potential of anode 10 moves in a negative direction from its quiescent value.

Figure 3:
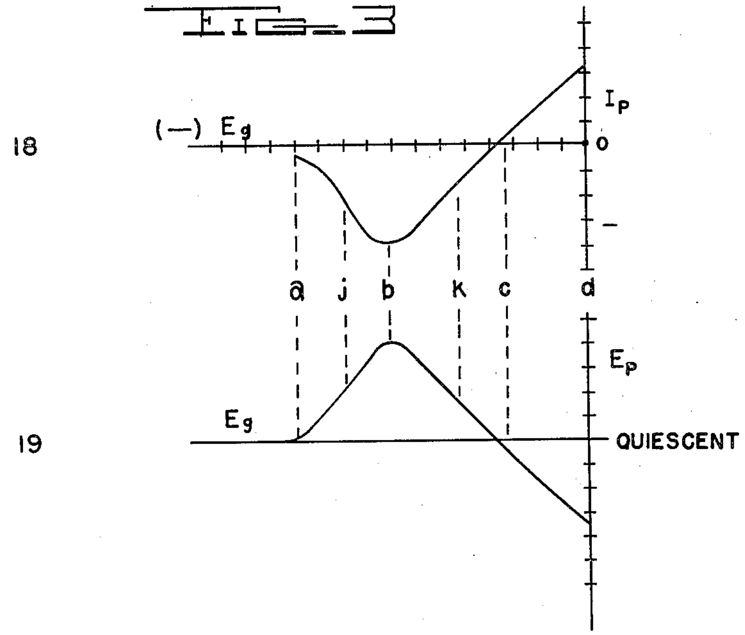
Figs. 3 and 4 are wave forms employed in explaining the operation of the circuit shown in Fig. 2.

In wave form 18 of Fig. 3, net plate current ($I_p$) has been plotted as the vertical coordinate against the potential of grid 12 ($E_g$) on the horizontal axis and is representative of the transconductance characteristic of tube 6. As will be observed, the transconductance characteristic contains both a negative region between points *a* and *b* and a positive region between points *b* and *d*. At grid potential *a* and below, space current flow is negligible. In the grid potential region from *a* to *c* the primary current is less than secondary current. The variation in anode 10 potential ($E_p$) with variations in grid 12 potential ($E_g$) is shown in wave form 19. A 6AC7 operating with +300 volts on its screen grid 7 and +100 volts on its plate 10 gave a transconductance characteristic similar to that shown by wave form 18. In this connection it may be well to state that variations in the voltage gradient between the screen grid 7 and the anode 10 gave both a different slope to the negative transconductance portion *a* to *b* of the transconductance characteristic and also a different curvature to the inflection point *b*. The greater this voltage gradient the steeper the slope of the negative transconductance portions and the sharper the curvature of the inflection point *b* with optimum performance attainable with the above voltage parameters.

In Fig. 2 vacuum tube 20 and associated circuit components comprise one form of a conventional amplifying circuit connected so that the potential variations appearing at anode 10 of tube 6 are applied as signals to grid 21 via the coupling circuit comprising capacitor 22 and resistance 23. Potential 24, to which grid 21 is connected through resistance 23, is such that tube 20 is nonconducting in the quiescent condition and requires a positive signal on grid 21 before plate current can flow. The flow of plate current through resistance 25 in response to a positive signal applied to grid 21 causes a negative signal to appear at plate 26 and thus at output 27 of the discriminating circuit of Fig. 2. Negative signals from anode 10 applied to grid 21 will only drive tube 20 further below cutoff and will be impotent insofar as any output at 27 is concerned.

Figure 4:
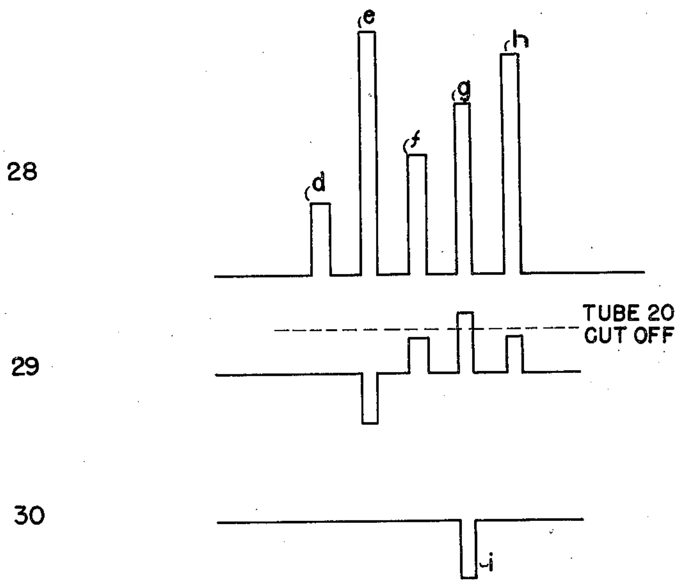

In operation, potential 15, the source of grid bias for tube 6, is so fixed that a positive pulse having the amplitude of a desired signal will, when applied at input 3, cause a net plate current flow which is such as to cause a rise in potential at anode 10. This rise, applied to grid 21 of tube 20, causes plate current flow and thus a negative signal output at 27. An interference positive pulse at input 3 of amplitude less than a certain value will not distrub the quiescent condition of tube 6. An interference signal of amplitude greater than a certain value causes a net plate current flow which is such as to bring about a decrease below quiescent potential at anode 10. This negative going variation applied to grid 21 of tube 20 has no effect as hereinbefore explained. It will be obvious that potential 24, the source of grid bias for tube 20, can be fixed at a point such that only the most positive swings of anode 10 will cause a signal to appear at output 27. Operation in this fashion is illustrated in Fig. 4, in which wave form 28 is representative of a series of electrical impulses applied to input 3 of Fig. 2. In this series, pulse *g* represents the desired signal, while pulses *d*, *e*, *f*, and *h* represent interference signals. The behavior of tube 6 is response to these pulses, as expressed by the potential at anode 10 is shown by wave form 29. On this wave form has been shown the level to which anode 10 must rise before placing tube 20 in a conducting condition. The behavior of tube 20 in response to the signals from anode 10, as expressed by the output at 27, is shown by wave form 30.

With reference to wave form 28, pulse *d* is of insufficient amplitude to cause conduction by tube 6 and does not, therefore, affect the output of the discrimination circuit. Pulse *e* is of an amplitude so great that the potential of grid 12 of tube 6 is driven into the positive transconductance region and to a point between *c* and *d* of Fig. 3 in which net plate current flow causes a negative signal to appear at anode 10. As previously explained, this negative potential change at anode 10 only biases tube 20 further into the non-conducting state and thus pulse *e* does not affect output 27 of the discriminating circuit. Pulse *f* is of an amplitude such that the potential of grid 12 of tube 6 is driven into the negative transconductance region *a* to *b* of Fig. 3, such as potential *j*. Potential *j* at grid 12 will cause a net plate current flow such that anode 10 is positive with respect to quiescent potential but the positive swing of anode 10 is less than that which would have occurred had grid 12 been driven to the inflection point *b* of the transconductance characteristic. Since potential 24, the source of grid bias for tube 20, has been fixed at such a value that only the most positive swings of anode 10 will unbias tube 20 and cause a signal to appear at output 27, pulse *f* does not affect output 27 of the discrimination circuit. Pulse *g*, the desired signal, is of an amplitude such that the potential of grid 12 of tube 6 is driven to the inflection point *b* of Fig. 3. The application of potential *b* to grid 12 causes a maximum flow of tube 6 plate current in the direction such as to give the strongest positive signal at anode 10 and this maximum positive swing is sufficient to unbias tube 20. Pulse *g* therefore causes plate current flow in tube 20 and a corresponding negative signal at output 27 of the discrimination circuit as indicated by pulse *i* of wave form 30. Pulse *h* is of an amplitude such that the potential of grid 12 of tube 6 is driven into the positive transconductance region *b* to *c* of Fig. 3 such as potential *k*. Potential *k* at grid 12 will cause a net plate current flow such that anode 10 is positive with respect to quiescent potential but the positive swing of anode 10 is less than that which would have occurred had grid 12 been driven only to potential *b*. Pulse *h* therefore fails to unbias tube 20 and has no effect on output 27 of the discrimination circuit.

Thus the discrimination circuit shown in Fig. 2 acts to discriminate against pulses of too low an amplitude and of too great an amplitude and to discriminate in favor of pulses of a definite predetermined amplitude characteristic controllable as hereinbefore described. This circuit also acts to discriminate against pulses of negative polarity although the detected output of high frequency stage 2 of Fig. 1 would, in the embodiment shown, consist only of positive pulses.

It will be apparent that an amplitude discrimination circuit constructed in accordance with the teachings of this invention will have a wide variety of applications in radio, radar, television, and other electronic fields whenever discrimination between potential variations is desirable and the amplitude characteristics or the amplitude and polarity characteristics of said potential variations can be used as the basis for such discrimination. It will also be apparent that an amplitude discrimination circuit constructed in accordance with the teachings of this invention may be used in combination with other circuits, also discriminatory in response, whose action is based on other characteristics of the input signal such as time duration or rate of change.

It will also be apparent to those well versed in the art that the particular amplifier stage represented by tube 20 and associated circuit components in Fig. 2 may be replaced by a variety of means responsive only to the positive excursions of anode 10 of tube 6 as hereinbefore described without exceeding the scope of this invention.

Since certain further changes may be made in the foregoing constructions and different embodiments of the invention may be made without departing from the scope thereof, it is intended that all matters shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A means of pulse amplitude discrimination, comprising a vacuum tube, means providing the transconductance characteristic of said tube with an inflection point, said inflection point defined by a negative transconductance region on one side thereof and a positive transconductance region on the other side thereof, means biasing said tube so that input signals of the preferred amplitude drive the tube to the point of inflection in said transconductance characteristic, and an amplitude responsive device arranged to operate from the output of said tube and adapted to respond only when said input signals drive said tube to said point of inflection.

2. A means of pulse amplitude discrimination, comprising a vacuum tube having at least a cathode, an anode, a control electrode and one other electrode, a source of potential, means connecting said anode to a point of positive potential on said source, means connecting said other electrode to a point of higher positive potential on said source, so as to provide said tube with a point of inflection in its transconductance characteristic, said point of inflection defined by a negative transconductance region on one side thereof and a positive transconductance region on the other side thereof, means biasing said tube so that input signals of the preferred amplitude drive the tube to the point of inflection in said transconductance characteristic, an amplitude responsive device arranged to operate from the output of said tube and adapted to respond only when said signals drive said tube to said point of inflection.

3. A means of pulse amplitude discrimination, comprising a vacuum tube having at least a cathode, an anode, a control electrode and one other electrode, a source of potential, means connecting said anode to a point of positive potential on said source, means connecting said other electrode to a point of potential at least twice as positive as said anode, so as to provide said tube with a point of inflection in its transconductance characteristic, said point of inflection defined by a negative transconductance region on one side thereof and a positive transconductance region on the other side thereof, means biasing said tube so that input signals of the preferred amplitude drive the tube to the point of inflection in said transconductance characteristic, an amplitude responsive device arranged to operate from the output of said tube and adapted to respond only when said signals drive said tube to said point of inflection.

4. A means of pulse amplitude discrimination, comprising a first vacuum tube, means providing the transconductance characteristic of said tube with an inflection point, said inflection point defined by a negative transconductance region on one side thereof and a positive transconductance region on the other side thereof, means biasing said tube so that input signals of the preferred amplitude drive said first tube to the point of inflection in said transconductance characteristic, and a second vacuum tube arranged to operate from the output of said first tube and adapted to respond only when said input signals to said first tube drive the latter to said point of inflection.

5. A means of pulse amplitude discrimination, comprising a vacuum tube, means providing the transconductance characteristic of said tube with an inflection point with a negative transconductance region on one side thereof and a positive transconductance region on the other side thereof, means for regulating the slope of said transconductance characteristic, means biasing said tube so that input signals of the preferred amplitude drive the tube to the point of inflection in said transconductance characteristic, and an amplitude responsive device arranged to operate from the output of said tube and adapted to respond only when said input signals drive said tube to said point of inflection.

CONRAD H. HOEPPNER.

REFERENCES CITED

The following references are of record in the file of this patent:

UNITED STATES PATENTS

| Number | Name | Date |
|---|---|---|
| 2,226,752 | Eaglesfield | Dec. 31, 1940 |
| 2,230,243 | Haffcke | Feb. 4, 1941 |